Sept. 23, 1969    J. A. W. IVES    3,468,033
MEASURING AND CALCULATING MEANS FOR GAUGING OR MEASURING DEVICES
Filed Dec. 19, 1966    9 Sheets-Sheet 1
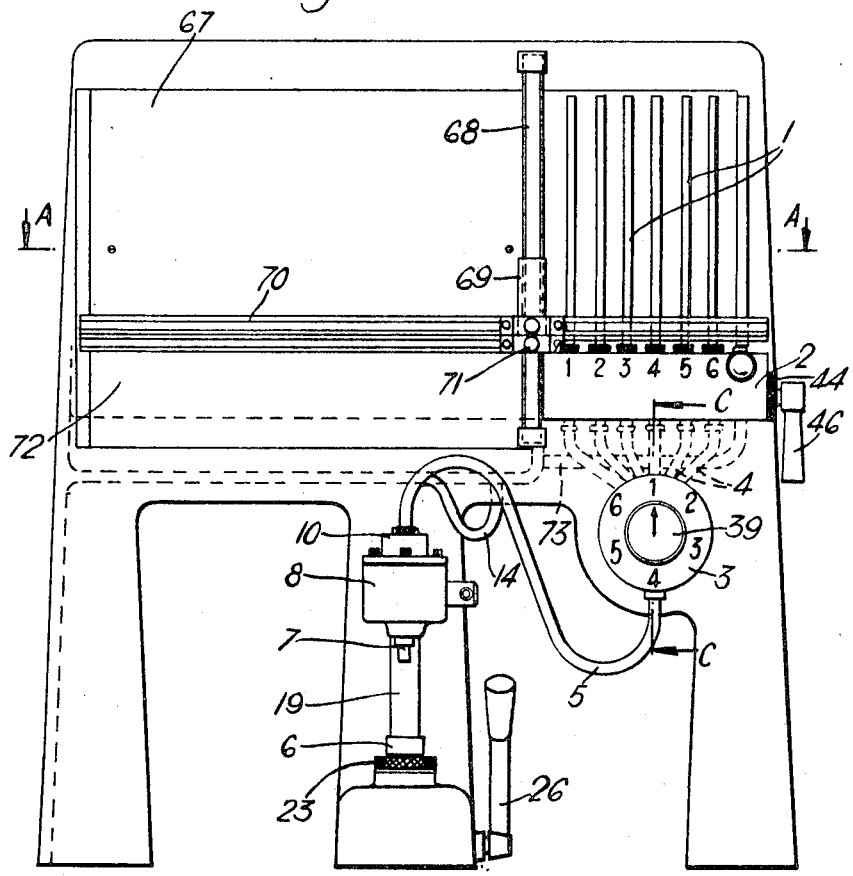
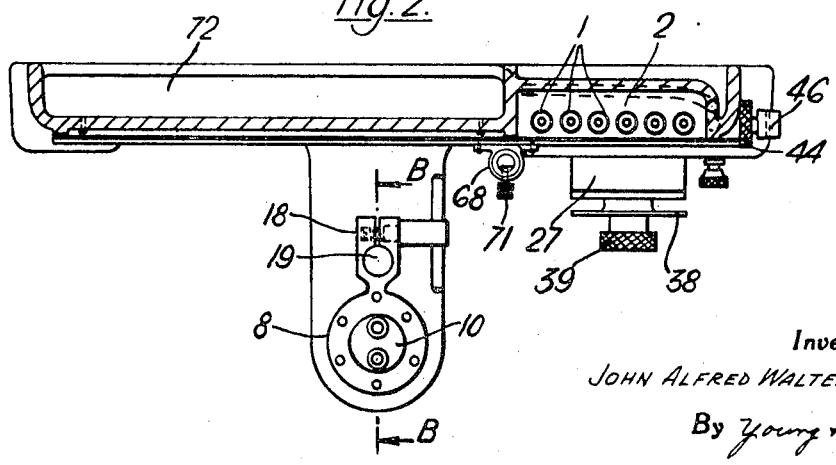
Inventor
JOHN ALFRED WALTER IVES
By Young & Thompson
Attorneys

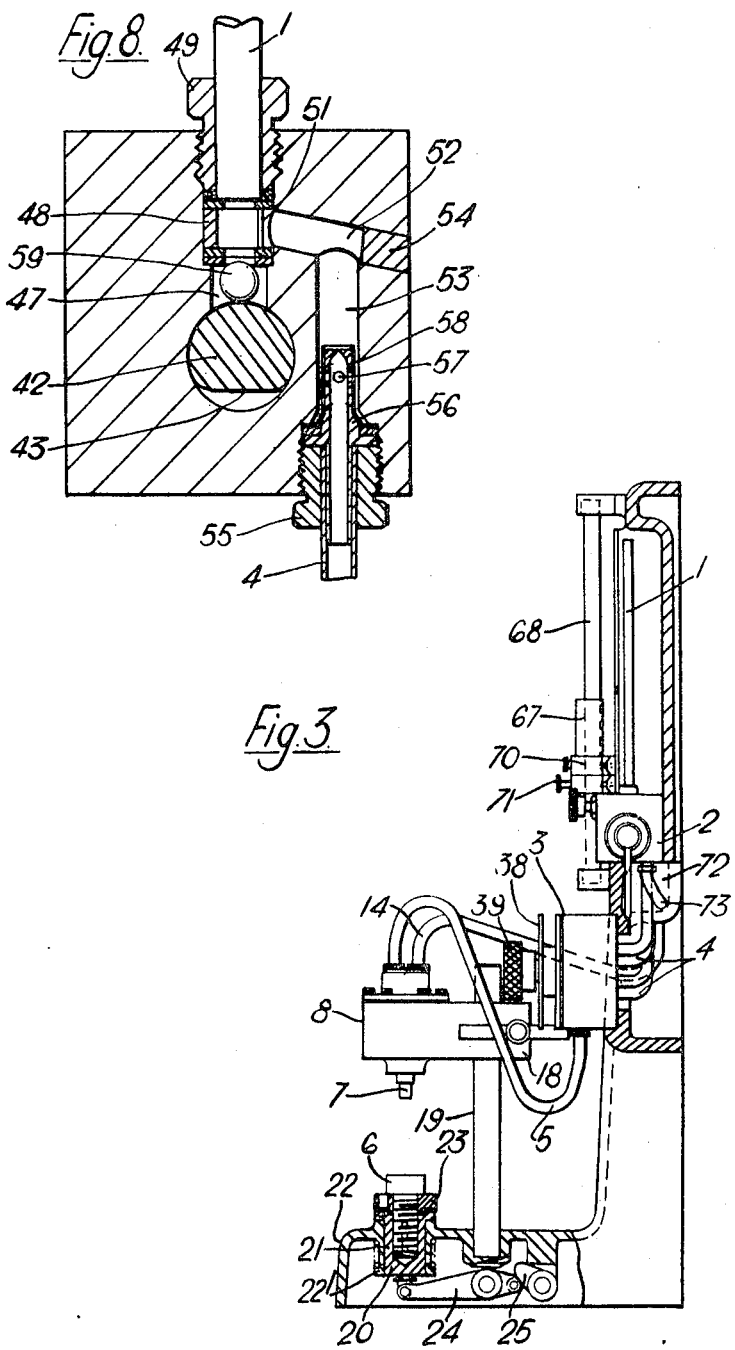

Sept. 23, 1969  J. A. W. IVES  3,468,033
MEASURING AND CALCULATING MEANS FOR GAUGING OR MEASURING DEVICES
Filed Dec. 19, 1966  9 Sheets-Sheet 3
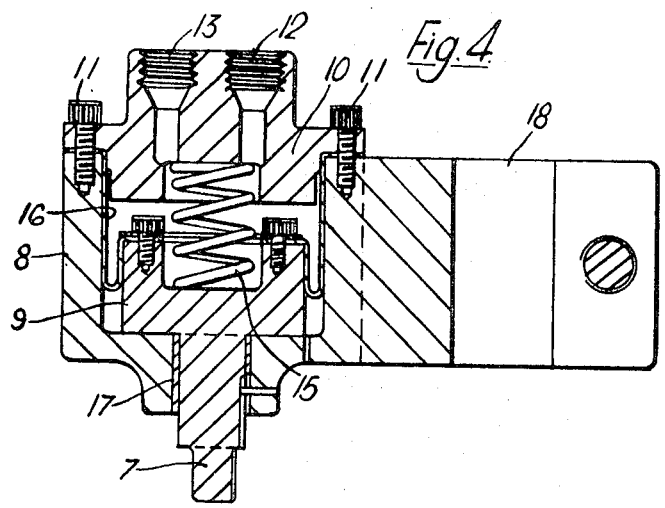
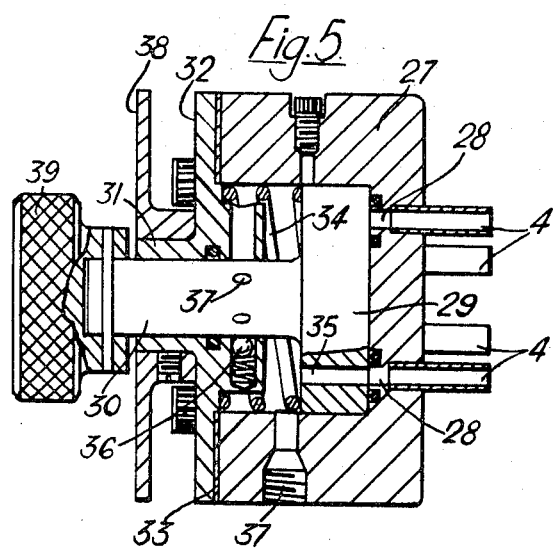
Inventor
JOHN ALFRED WALTER IVES
By Young & Thompson
Attorneys Sept. 23, 1969  J. A. W. IVES  3,468,033
MEASURING AND CALCULATING MEANS FOR GAUGING OR MEASURING DEVICES
Filed Dec. 19, 1966  9 Sheets-Sheet 4

Inventor
JOHN ALFRED WALTER IVES
By Young & Thompson
Attorneys

Inventor
JOHN ALFRED WALTER IVES
By Young + Thompson
Attorneys

Sept. 23, 1969   J. A. W. IVES   3,468,033
MEASURING AND CALCULATING MEANS FOR GAUGING OR MEASURING DEVICES
Filed Dec. 19, 1966   9 Sheets-Sheet 7

Inventor
JOHN ALFRED WALTER IVES
By Young & Thompson
Attorneys

Sept. 23, 1969   J. A. W. IVES   3,468,033
MEASURING AND CALCULATING MEANS FOR GAUGING OR MEASURING DEVICES
Filed Dec. 19, 1966   9 Sheets-Sheet 9

Inventor
JOHN ALFRED WALTER IVES

By Young + Thompson
Attorneys

United States Patent Office 3,468,033
Patented Sept. 23, 1969

3,468,033
MEASURING AND CALCULATING MEANS FOR GAUGING OR MEASURING DEVICES
John Alfred Walter Ives, 31 Braemar Road,
Brentford, Middlesex, England
Filed Dec. 19, 1966, Ser. No. 602,655
Claims priority, application Great Britain, Jan. 11, 1966, 1,261/66
Int. Cl. G01b 5/00
U.S. Cl. 33—147     15 Claims

ABSTRACT OF THE DISCLOSURE

For use with gauging or measuring equipment display or calculating means comprise a plurality of indicating means in which representations of successive measurements can be separately set up and held for subsequent comparison with one another. Means may be provided to obtain an indication of the average value of the different individual indications. The indicating means may comprise liquid columns in an array of side-by-side tubes, each having a valve for opening to communicate with measuring means and for closing to hold the liquid column in set position. The measuring means may communicate with the tubes by fluid pressure.

---

This invention relates to indicating or calculating means for gauging or measuring devices.

In checking or assessing the efficiency of a repetitive manufacturing operation it is often desired to ascertain in a substantially statistical manner the range of errors or variations to which the delivered products may be subject, or to average the errors noted in a series of products. Statistical observations of this kind not only provide useful information about the operation in question, but may also be used as a basis for adjustment and/or control of the operation in order to improve the accuracy of the product.

The object of the present invention is to provide means for facilitating observations of the aforesaid kind, and with this end in view the invention consists in an indicating or calculating device comprising means for separately displaying a plurality of measurements of a physical characteristic in relative positions which facilitate comparison with one another.

The device may be formed for attachment to a known measuring or gauging device, and while it is applicable to measurement of any physical characteristic, e.g., dimensions, weight, hardness etc., it may perhaps be more readily understood when used in connection with the gauging or measurement of a dimension such as the diameter of a cylindrical article. In such a case the indicating device in accordance with the invention, in operative association with means, for gauging or measuring the diameters of the cylindrical articles, would provide separate indications of the measured diameters (or of their errors from a desired standard) of a group of the cylindrical articles, e.g., say six successively and selectively measured or gauged articles. The measurements may be displayed side by side for ready comparison with one another and/or with a prearranged or preset standard, and may be associated wtih a chart and/or a recording board on which a graph can be plotted, or statistical markings and records laid out.

The readings are preferably transmitted to the indicators by hydraulic means, and the indications may be displayed in like manner, e.g., by the height of a liquid in a tube.

A plurality of separate gauging or measuring operations may provide indications displayed in adjacent positions, e.g., side by side, where comparison is facilitated. The readings to be displayed may be passed to the indicating devices by fluid pressure through a selector valve whereby the pressure transmitting means can be put into communication with the various indicating means, one after another, to indicate the individual readings being taken, or each of the indicating means may be provided with its individual valve whereby an operator can make or cut off communication thereof with the pressure transmitting means.

Means may be provided for averaging the indicated readings of a group of measurements, and observing the average value. When the indications are given by the height of liquid in tubes, these averaging means may interconnect the tubes to allow the liquid therein to rise or fall to an "average" level common to all of those interconnected.

The invention will be clearly understood from the following description of one form (given, however, merely by way of example) which it may assume, and this description will be more readily followed by reference to the accompanying drawings wherein FIGURE 1 represents in front elevation indicating means in accordance with the invention;

FIGURE 2 represents a sectional plan view along the lines A—A of FIGURE 1;

FIGURE 3 represents a side sectional elevation of FIGURE 1, partly broken away and in section;

FIGURE 4 represents an enlarged side-sectional elevation of a hydraulic measuring device taken along the line B—B of FIGURE 2;

FIGURE 5 represents an enlarged side-sectional elevation of a selector valve taken along the line C—C of FIGURE 1;

FIGURE 8 represents a side sectional elevation along the line E—E of FIGURE 6;

FIGURES 11, 12 and 13 represent respectively side sectional elevations along the lines A—A, B—B and C—C of FIGURE 9, and with further reference to additional drawings herewith wherein

Figure 6:
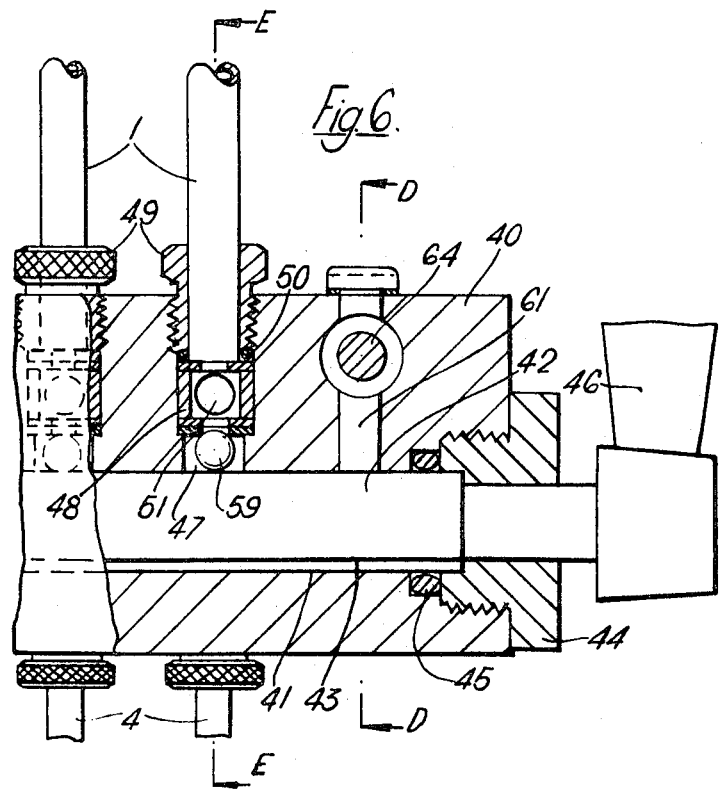
FIGURE 6 represents an enlarged front sectional elevation of part of the manifold and averaging valve shown in FIGURES 1–3.

In carrying the invention into effect in one convenient manner, as shown in FIGURES 1–8 of the aforesaid drawings, indicating means for gauging or measuring devices comprise a plurality of substantially vertical indicating tubes 1 of transparent material mounted in, and upstanding from, a manifold 2. A selector valve 3 having a number of outlets corresponding to the number of tubes 1 is connected by flexible or other pipes 4 to the tubes, each outlet being connected to one of the tubes and the valve settings being numbered (e.g. one to six as shown) to correspond to the tubes 1 similarly numbered. A flexible pipe 5 connected to the inlet side of the valve 3 communicates hydraulic fluid displacement thereto, and when the selector valve is moved to its different settings this fluid displacement is communicated through the valve to the corresponding tube of the group 1, in each case. As will be explained more fully below pressure communicated to an indicating tube forces liquid into the tube to a height corresponding to the applied pressure, thus providing a reading of that pressure. The pressure communicated through the tube 5 and valve 3 is derived from a measuring device used to measure or gauge the physical characteristic under observation (e.g. in the present instance a dimension of an article), and in the preferred manner of using the device a plurality of articles are measured or gauged successively, and the separate readings indicated in the various indicator tubes. Thus the valve 3 being set to its position "1" the first article will be measured and a head of liquid set up, and retained, in indicator tube numbered "1." The valve 3 will then be set to position "2" and a head of liquid corresponding to the measurement of the second article set up and retained in indicator tube numbered "2." Further re-setting of the valve 3 allows indications of the measurement of succeeding articles to be indicated in tubes numbered "3," "4," "5" etc., until all the tubes in use or available show a reading. The various readings, seen side by side can then be compared, averaged, recorded and/or otherwise used for statistical or other purposes, as will become apparent more fully below.

In the form of the invention shown in the aforesaid drawings the dimension of an article being measured or gauged is determined by locating the article between a table 6, and the probe 7 of a hydraulic measuring or gauging device. The table 6 is pre-set to a desired height, and an article resting on the table is contacted on its opposite face by the probe 7 which is displaced by the article and causes liquid e.g. water or oil to flow through the pipe 5, valve 3 and a pipe 4 to one of the indicator tubes, where a "correct" or a greater or less head of oil is set up according as the article is of standard dimension, or over or under sized.

The hydraulic gauging device is shown in FIGURE 4 and comprises a cylindrical casing 8 in which is slidable a piston head 9 from the base of which the probe 7 projects downwards through a bore in the base of the casing. The casing 8 is closed by a cap or cover 10 held thereon by screws 11. Ducts 12, 13 through the cover 10 are screw-threaded to receive the couplings of the ends of flexible tubes, the tube 5 being connected to one duct, say 12, and another tube 14 (FIGURE 1) being connected between the other duct 13 and the oil or water reservoir 72. In, or at one or other end of, the tube 14 between the casing 8 and the reservoir is provided a non-return valve (not shown) to allow liquid to pass from the reservoir to the casing 8, but not in reverse direction. This valve may be of one or other of the forms described below with reference to FIGURE 8 (components 56, 57 and 58), or to FIGURE 16. A passage 62 and pipe 73 form a duct for movement of liquid from the manifold 2 to the reservoir. The reservoir 72 may in some cases be dimensioned and located in the frame so that the level of liquid in the apparatus is at a prearranged height, e.g. as seen in the tubes before observations are taken. A compression spring 15 held between cup recesses in the cover 10 and piston head 9 urges the piston downwards. A flexible seal 16 secured at one end between the cover 10 and casing 8, and at the other end by a screw-held annular washer to the piston head 9 prevents passage of oil from the casing other than through the ducts 12, 13.

In order to hold the infolded diaphragm 16 firm against the walls 8, 9 it has been found advantageous to load the annular "pocket" at the base of the seal with a heavy liquid, such as mercury.

The probe 7 moves in a sealed bearing 17. The casing 8 is provided with a clamp bracket 18 by which it can be secured to, and supported by a column 19 of the instrument frame (FIGURE 1) over the table 6.

The table 6 is screwed into a cylindrical block 20 slidable vertically in a cylinder 21 formed in the base 22 of the instrument (FIGURE 3) and a nut 22' retains a spring coiled round the block 20. Secured to the top of the block is a rotatable nut 23 by which the screw supporting the table 6 can be raised or lowered. The piston block 20 can be raised and lowered by a pivoted lever 24 actuated by a cam 25 rockable by a hand-lever 26 (FIGURE 1). By these means the table 6 can be set at any desired distance, within limits from the probe 7 according to the standard size of the articles being gauged. If desired any convenient form of locking or clamping means may be provided to lock the block 20 in any desired setting, or to lock its operating mechanism, e.g. the lever 24, to hold the block in a desired position.

The construction of the selector valve 3 is illustrated in FIGURE 5. A cylindrical dished casing 27 has a series of bores 28 through its base equispaced in circular array, and the ends of the tubes 4 are secured in these bores 28. A rotor 29 has a shaft 30 extending through a bearing 31 in a cover 32 which is secured over the mouth of the casing 27 with a sealing gasket 33. A helical compression spring 34 between the cover 32 and rotor 29 presses the rotor against the base of the casing to close the outlets 28. The rotor has a single duct 35 extending through the rotor and parallel to the rotor axis, at a radius corresponding to that of the circular array of the bores 28 of the casing 27. A transverse bore in the bearing 31 houses a spring-loaded detent ball 36 which engages in one or other of a series of notches 30' spaces round the shaft 30. These notches locate the rotor 29 in angular positions in which the duct 35 is in register with corresponding bores 28. A bore 37 through the side of the casing 27 is screw-threaded to receive the coupling member at the end of the pipe 5. Thus when oil is forced through the pipe 5 as a result of a measurement by the probe 7 and table 6, it enters the casing 27 through the passage 37, and passes through the duct 35 to whichever bore 28 is aligned for the time being with the duct 35, and from this bore to the connected tube 4, and thence to the corresponding indicator tube to set up a head of oil recording the reading of the measurement. A disc 38 mounted in front of the casing 27, 32 is circularly calibrated (e.g. numbered at angular intervals) so that an arrow on the milled knob 39 of the shaft 30 enables an operator to select which bore 28 is to be aligned with the passage 35. The passages into and from the casing are provided with suitable seals e.g. O-rings.

Figure 7:
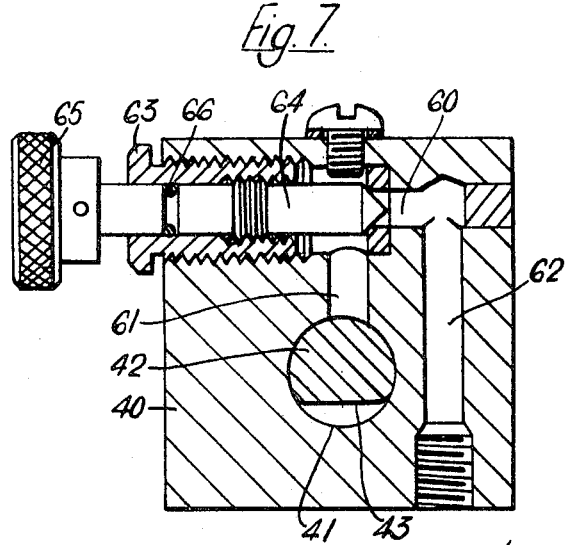
FIGURE 7 represents a side sectional elevation along the line D—D of FIGURE 6.

Details of the manifold and of the oil passages therethrough are shown in FIGURES 6, 7 and 8. A block 40 has a longitudinal cylindrical bore 41 in which is rotatably fitted a cylinder 42 having a flat 43 longitudinally along one side. The bore 41 is closed at one end, and at the other end is sealed by a screwed-in plug 44 with a sealing ring 45, the plug having a bore serving as a bearing for the shaft of the cylinder 42 which extends through it and is fitted with a hand-lever 46 by which the cylinder 42 can be rotated.

In spaced positions longitudinally of the bore 41, and communicating therewith, are a number of vertical passages 47 each leading to a rectangular chamber 48 in the block 40. Over each chamber 48 the block 40 has a screw-threaded bore in which is screwed a plug 49 locking in position an indicating tube 1 in communication with the chamber 48. A sealing ring 50 beneath the plug 49 prevents passage of oil. An aperture 51 through the rear wall of each chamber 48 communicates with a rearwardly extending passage 52 running to a vertical passage 53 having an enlarged aperture or mouth in the undersurface of the block. The rear end of the passage 52 is sealed by a bung or closure 54. In the mouth of the passage 53 a screwed-in plug 55 similar to the plug 49 locks in position the end of a tube 4 from the selector or distributor valve 3. A flanged tubular member 56 held in the passage 53 by the plug 55 has apertures 57 in its wall normally closed by a sleeve 58 of resilient material, e.g. a synthetic resin, fitted on the tube 56, to serve as a non-return valve. Oil forced through the tube 4 and the apertures 57 stretches the sleeve 58 and passes by way of passages 53, 52 and chamber 48 to an indicator tube 1, but the sleeve 58 prevents oil movement in reverse direction. A ball 59 is normally held by the cylinder 42 against the aperture in the base of each chamber 48 to prevent passage of oil downwards from the chamber.

At the end of the block 40 fitted with the lever 46 a bore 60 running from front to rear of the block traverses and communicates with a vertical bore 61 running to the bore 41, and a rear vertical bore 62 having an enlarged mouth in the undersurfaces of the block 40, to receive a union or coupling member of a pipe 73 which connects the bottom of the manifold 2 to the reservoir 72. In the enlarged, screw-threaded front opening of the bore 60 is fitted a plug 63 fitted with an adjustable valve stem 64 having a milled head 65, and a sealing ring 66 in a suitable peripheral groove. The inner end of the stem 64 can engage in the mouth of the bore 60 and when so engaged seals it to prevent passage of oil from the bore 62.

The operation of the abovedescribed device is as follows:

The table 6 is set to a selected height, as described above, to allow suitable spacing to accommodate articles being measured. This may be effected by raising or lowering the hydraulic measuring device 8 on its column 19 to set the probe 7 and table 6 in approximately correct spacing to accommodate articles of the size being measured, when the block 20 is raised to its uppermost position by depression of the lever 26. A master gauge is then placed between the elements 6, 7 and the table 6 raised by turning of the trapped nut 23 until the fluid in indicator tube No. 1 is forced up to the level of an upper datum line (which may be pre-marked on the board 67, or on a chart thereon). The manifold is then drained of fluid through the valve 64, 65 to a lower datum line, which may be determined by the level of fluid in the reservoir, the fluid normally being maintained at a constant level therein. All the indicator tubes are drained by this means to the prearranged lower datum level. The cylinder 42 is set to the angular position shown in FIGURES 6–8 to hold the balls 59 against the base openings of the chambers 48 in order to seal them. The selector valve 3 is then successively set to different positions (e.g. positions "1," "2," "3," "4" etc.), and after such settings articles successively selected one at a time from a group are each measured between the table 6 and probe 7, to provide indications in the tubes numbered "2," "3," "4" etc. Thus after six operations the array of indicating tubes will show on each tube a reading of the dimension of one article of the series. The variation of readings, as between themselves, and/or by reference to the pre-set standard reading can thus readily be observed.

To note an average of the group of readings the valve 64, 65 is closed in to seal the passage 60, 62 and the cylinder 42 is rotated by the lever 46 to bring the flat 43 beneath the balls 59 which thus fall to open the base apertures of the chambers 48. The oil columns in the tubes 1 are thus in communication through the cylindrical bore 41, and in each of them the oil level varies until all show the same "average" reading.

To facilitate recording and calculation of the observations the frame of the equipment may incorporate, or support, beside the array of indicator tubes 1 a flat board or like surface 67. A tube or rod 68 extending beside the tubes 1, and parallel to them, between the top and bottom edges of the frame, may carry a slidable sleeve 69 thereon, and attached to the sleeve may be one or more transverse bars or beams 70 (which may be transparent) stretching on one side across in front of the tube 1, and on the other side across the board 67. As shown two transverse bars are provided, the lower one fixed to the sleeve 69, and the upper slidably adjustable on the sleeve. The sleeve 69 can be locked in any desired position on the rod or tube 68 by a clamping screw 71. A chart or graph, or graph-paper for preparing one, may be affixed to the surface 67, or the surface may be adapted to receive erasable markings. The bar 70 serves as a cursor movable up and down e.g. to co-relate an indicator in a tube 1 with a marking on a chart on the surface 67.

In an alternative form of gauging and measuring device in accordance with the invention the selector valve may be dispensed with, and the indicating tubes provided with individual control valves.

Referring to FIGURES 9–13 of the aforesaid drawings modified valve and manifold means replace the selector valve 3 and manifold 2 (and the component parts incorporated therein) of the previously described device, and are connected between the pipes 5 and 73 shown in FIGURE 3. The modified manifold comprises a block 74 longitudinally bored to form a chamber 75 closed at one end by a screw cap 76. The block 74 is held to the back of the framework of the apparatus by finger screws 77. The cavity 75 is filled with oil or other liquid from the reservoir, as in the previously described device, and air can be bled from the cavity by release of a screw 78 which is subsequently replaced. Pressure from the hydraulic measuring device is communicated to the cavity 75 by a passage 79 in the block 74, which is connected to the tube 5. Indicator tubes 1 held in spaced bores of the block 74 by screw collars 49 communicate with valve means allowing them individually to be put into communication with, or cut off from, the cavity 75.

Figure 10:
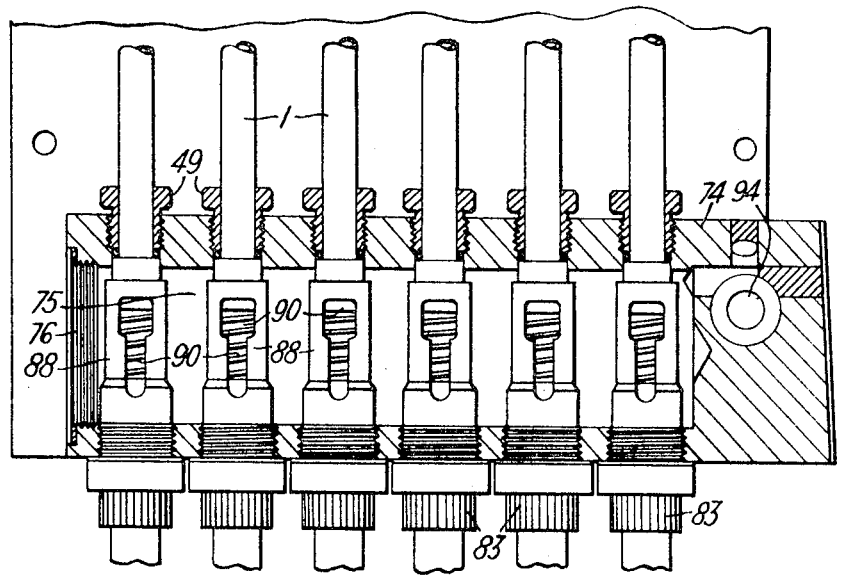
FIGURE 10 represents an enlarged sectional front elevation of part of the device shown in FIGURE 9.

These valve means are operable by manual levers 80 each pivotally mounted at 81 between lugs 82 held by screws (FIGURE 12) beneath the block 74. In the base of the block 74 axially aligned with each indicator tube 1 is screwed a sleeve 83 in which is slidably mounted a cylindrical casing 84 housing a magnet 85. The inner end of the lever 80 has a pin-and-slot connection 86 with the casing so that the casing and magnet can be raised and lowered by rocking of the lever 80. The upper end of the sleeve 83 is sealed by an integral diaphragm 87, and a second sleeve 88 is telescoped on to the sleeve 83. At its upper end, in the cavity 75, the sleeve 88 has a connection 89 which holds a sealing against the lower end of the corresponding indicator tube 1. The wall of each sleeve 88 is apertured, as at 90 (FIGURE 10). In each sleeve 88 is slidably mounted a valve 91 formed with a head which has a sealing disc of resilient material 92 adapted to close the lower open end of the seal 89 forming the bottom of the indicator tube 1. This valve is urged to its sealing position against the connection 89 by a coiled compression spring 93, so that normally the tube 1 is cut off from the cavity 75 and cannot receive liquid therefrom. It can be retracted by the magnet 85.

When a measurement is being taken the fluid displaced by the probe 7 making the measurement is communicated to the cavity 75 through the passage 79 as stated above. The operator depresses a selected lever 80 thus lifting the associated magnet 85 to the diaphragm 87, where the magnetic force which it exerts is sufficient to draw down the adjacent magnetic valve 91 against the action of its spring 93. This opens the lower end of the indicator tube 1, and liquid from the cavity 75 flows through the apertures 90 of sleeve 88 and rises in the tube 1 to a level corresponding to the said displacement set up by the piston in the chamber 8. The lever 80 can then be lifted to release the magnetic valve 91 which is then closed by its spring 93. Successive measurements are similarly indicated in adjacent tubes 1 by like operation successively of the individual levers 80, so that eventually the array of tubes show side by side a plurality of indications of a series of readings suitable for comparison and assessment as described in specification No. 1261/66.

To obtain an average reading of all the indications it is necessary only to lower all the levers 80 together, thus opening all the valves 91, 92 so that the liquid in the tubes 1, communicating through the cavity 75 finds a common, average, level.

When a series of readings is completed the cavity may be drained by opening a valve 94 to allow liquid to return through a port 95 to the reservoir, as in the previously described device.

Figure 12:
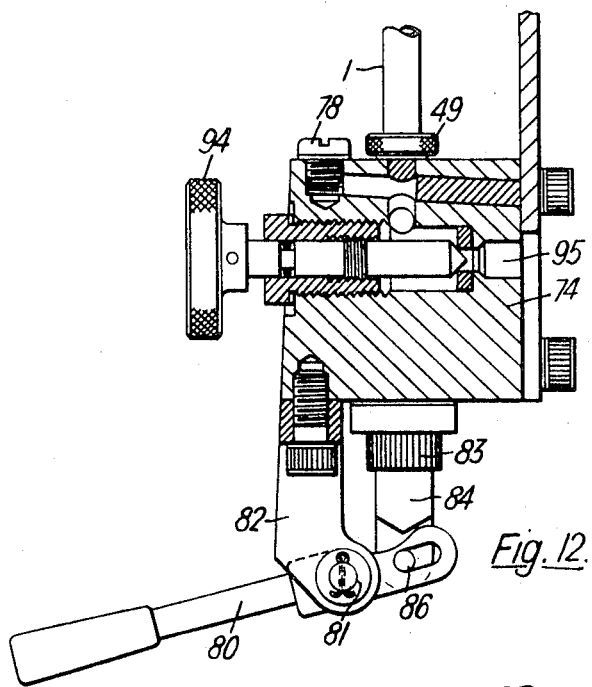
Figure 13:
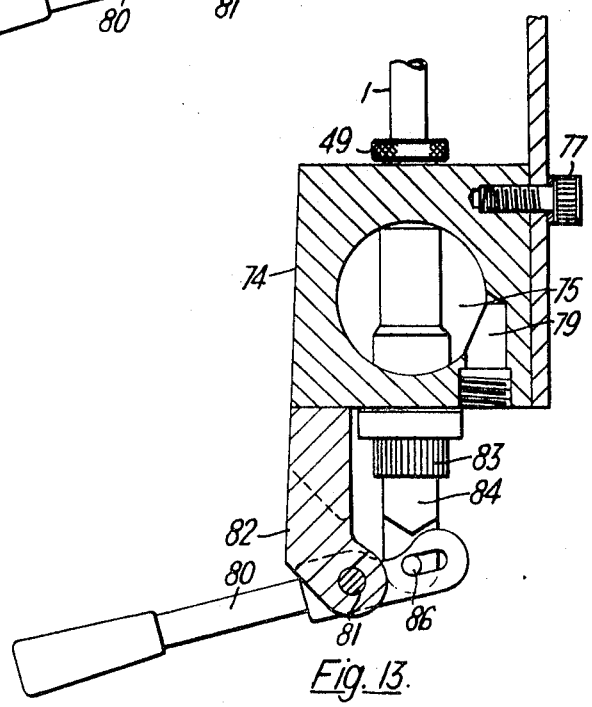
Figure 14:
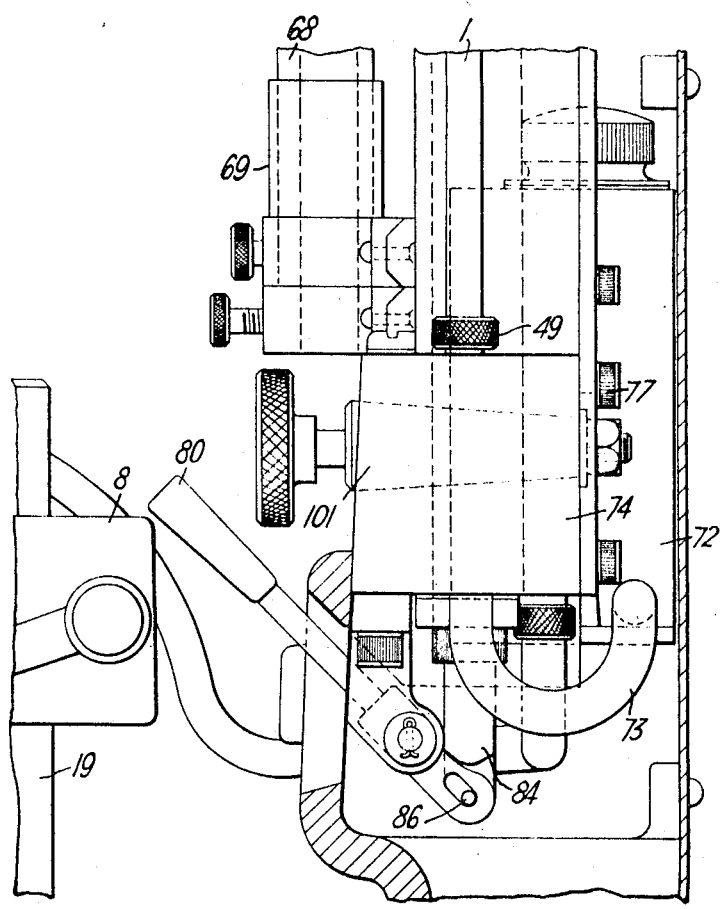
FIGURE 14 represents in enlarged sectional side elevation a part of the device shown in FIGURE 9.
Figure 15:
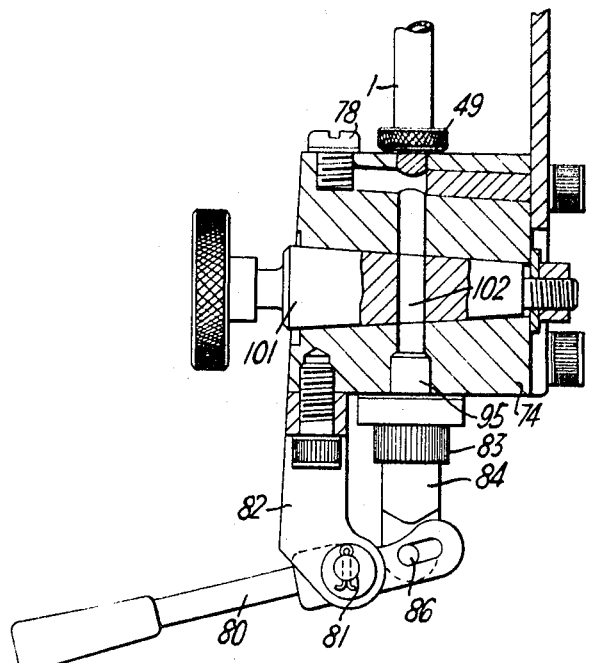
FIGURE 15 represents a sectional view of part of the device shown in FIGURE 14.

It has been found that in some circumstances the form of valve shown in FIGURES 7 and 12 when operated may disturb indications in the tubes 1, and to avoid this error, the valve may be replaced by another valve such as shown in FIGURES 14 and 15. This comprises a tapered or frusto-conical valve 101 with a transverse bore 102, which valve is housed in a conical seating in the block 74 to bring the bore 102 in line with the ducts leading respectively to the passage 95 and the tubes 1. When the valve is rotated to the position shown in FIGURE 15 the passage 95 and pipe 1 are in communication, but the connection is cut off by rotating the valve 101 through 90°.

Figure 9:
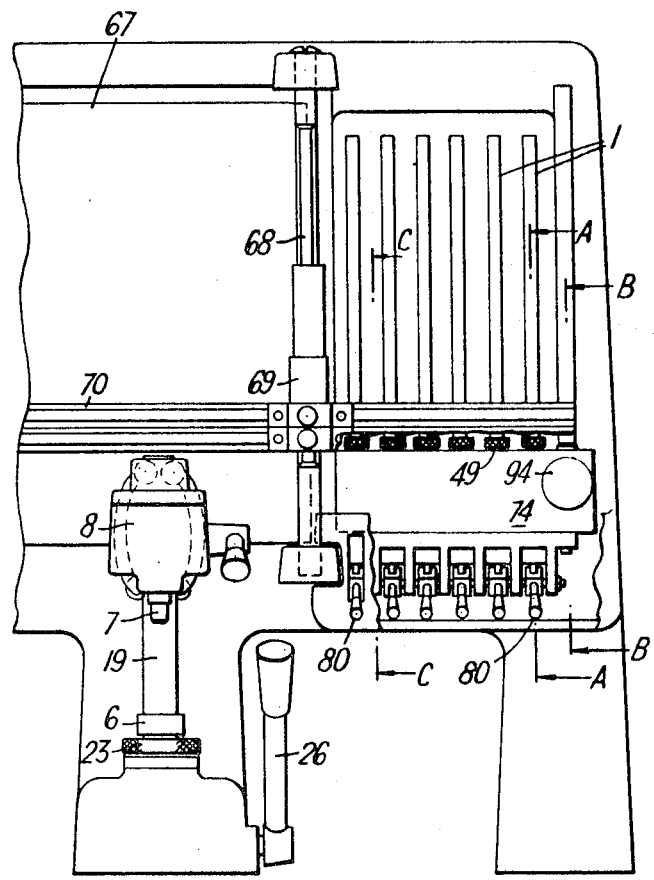
FIGURE 9 represents in front elevation part of a device incorporating the present invention.
Figure 11:
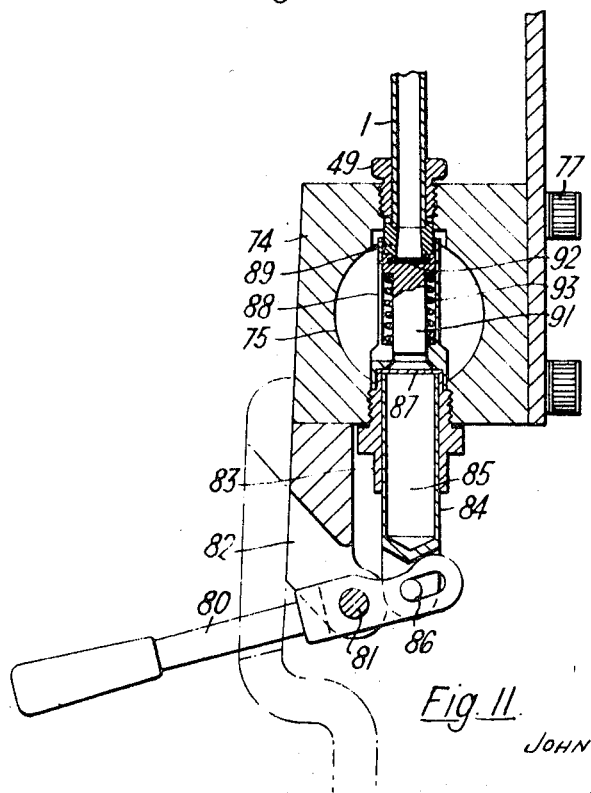
Figure 16:
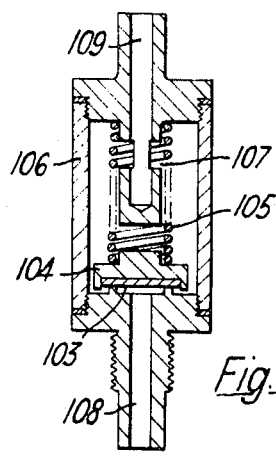
FIGURE 16 represents in section an alternative or additional form of non-return valve which may be incorporated in a device in accordance with the invention in place or in addition to the valve shown in FIGURE 8.

In FIGURE 16 is illustrated an alternative form of non-return valve comprising a flat disc 103 of resilient material fitted on a holder 104 is held against the mouth of an inlet 108 by a compression spring 105 encircling the lower end of an outlet passage 109 which projects into an intervening chamber 106. The end of passage 109 inside the chamber 106 is bored as at 107. Fluid under pressure lifts the disc 103, 104 and flows into the chamber 106 and hence to the passage 53. The spring-loaded disc 103, 104 closes the inlet 4 when the fluid pressure is relieved. A valve of the kind shown in FIGURE 16 may be installed in the line 5 between the casing 8 and the selector valve 3 (FIGURE 1), or the manifold chamber 74, 75 (FIGURES 9–11). The inlet 108 and outlet 109 may be connected to the free ends of the pipe 5 (divided to receive the non-return valve), or one to a casing (3, 8 or 75) and the other to the pipe 5. When so installed in a device such as shown in FIGURE 1, this valve will be additional to the non-return valves associated with the tubes 1. When fitted in a device as shown in FIGURE 9 the non-return valve, of the form illustrated in FIGURE 16 may be in series with a second non-return valve of the form shown in FIGURE 8 (components 56, 57, 58).

In the above described equipment the dimensions of the hydraulic measuring and transmission means may be suitably selected in order to introduce amplification, which may, for example, ensure that a small dimensional variation noted by the measuring means 6, 7 will appear as a larger displacement of the reading shown in an indicating tube. The indicator means constituting this invention may be formed as an attachment for releasable connection at an existing piece of equipment, and in this case the measurement of the physical characteristic under observation may be carried out by means other than the table 6 or probe 7. It is however preferred that whatever measuring means are used the value noted should be transmitted and indicated by hydraulic means substantially as described above.

In modifications of the invention the hydraulic indication of a measurement obtained as described above may be employed to actuate components e.g. contacts in an electric circuit in order to supply data to electrical or electronic equipment, or to motivate a hydraulic or pneumatic system by which further computations, records and/or indications may be provided.

From the above description it will be seen that the invention provides useful and versatile means for measuring a range of variations and/or an average of measurements carried out during a repetitive engineering operation of a productive character, and for using such information in a statistical manner, but it should be understood that the invention is not limited solely to the details of the form described above, which may be modified, in order to meet various conditions and requirements encountered, without departing from the scope of the invention.

What I claim is:

1. A measuring and indicating device comprising means for measuring a physical characteristic of each of a plurality of similar articles in succession, a plurality of tubes each containing a liquid column adapted to be displaced in order to represent a measurement, said tubes being located in positions relative to one another facilitating comparision, means for communicating the said successive measurements from said measuring means, separately, respectively to said tubes in order to displace the liquid columns therein each to a position representing the communicated measurement, and means for holding said liquid columns in the said displaced positions in order to allow subsequent comparison of the columns.

2. A device according to claim 1 wherein each measurement is represented as a length of liquid column above a datum or reference base.

3. A device according to claim 1 wherein the plurality of tubes are displayed in parallel, side-by-side assembly.

4. A device according to claim 1 comprising means for locating beside the display tubes a surface for use in recording, comparing, or making calculations from, the measurements indicated.

5. A device according to claim 1 comprising means for locating a sheet of graph paper beside, and in accurate prearranged position in relation to, the displayed measurement representations.

6. A device according to claim 1 comprising a slidable beam or cursor movable to facilitate visual comparison of the measurements indicated in said tubes.

7. A device according to claim 1 comprising fluid pressure means for transmitting the said measurements from the said measuring means to said respective tubes.

8. A device according to claim 1 comprising a fluid pressure chamber associated with and actuated by said measuring means, and means for putting the pressure chamber into communication with each of said tubes as desired.

9. A device according to claim 1 comprising a fluid pressure chamber associated with and actuated by said measuring means, and each tube is provided with its individual control valve whereby it can be put into communication with, or cut off from, said pressure chamber.

10. A device according to claim 1 comprising a fluid pressure chamber associated with and actuated by said measuring means, and the tubes communicate with a selector valve by which one or other at choice can be put into communication with said pressure chamber.

11. A device according to claim 1 comprising means for providing an indication of an average value of the different readings given by several of the individual tubes.

12. A device according to claim 1 wherein means are provided to put a plurality of such tubes simultaneously into communication with one another in order that the columns of liquid can assume a common level indicating an average reading.

13. A device according to claim 1 wherein said measuring means comprise contact members relatively movable towards and away from one another, adapted to sense a linear dimension of an article located between them when brought into contact therewith.

14. A device according to claim 1 wherein said measuring means comprise a contact member adjustable for pre-setting to a selected spacing from another contact member incorporated in said measuring means prior to taking measurements.

15. A device according to claim 1 comprising means for amplifying indications of measurements so that a small variation, from a datum value, of a reading of a physical characteristic is represented by a comparatively large change of indication in one of said tubes.

References Cited

UNITED STATES PATENTS

| | | |
|---|---|---|
| 1,258,426 | 3/1918 | Mackintosh. |
| 1,347,207 | 7/1920 | Coats. |
| 2,858,615 | 11/1958 | Aller. |

FOREIGN PATENTS

| | | |
|---|---|---|
| 1,190,642 | 4/1959 | France. |

SAMUEL S. MATTHEWS, Primary Examiner

U.S. Cl. X.R.

33—174; 73—420